J. A. BUTCHER.
RELIEF VALVE.
APPLICATION FILED FEB. 23, 1911.
1,145,671.
Patented July 6, 1915.
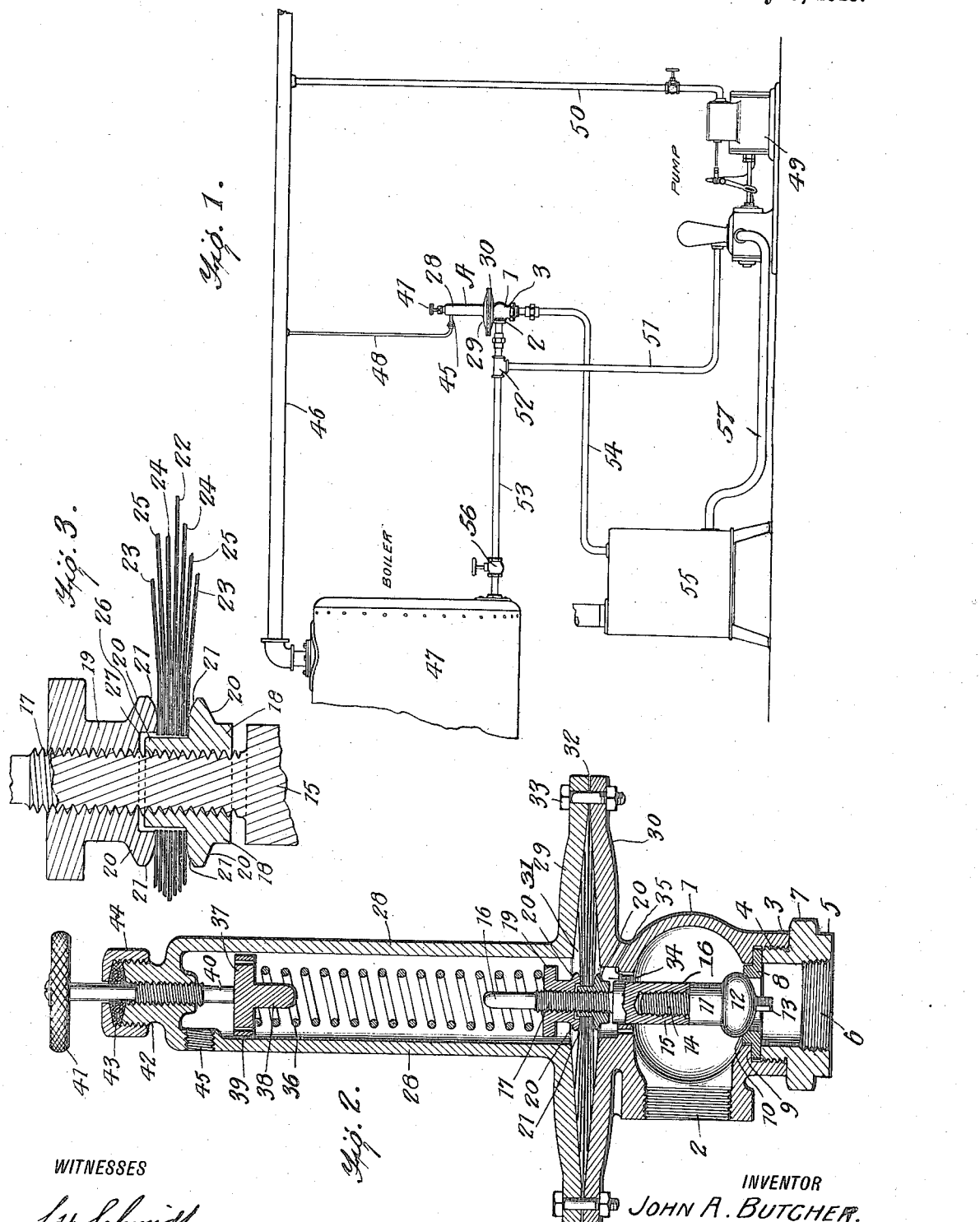
WITNESSES
INVENTOR
JOHN A. BUTCHER,
BY
ATTORNEYS

UNITED STATES PATENT OFFICE.

JOHN A. BUTCHER, OF YORK, PENNSYLVANIA.

RELIEF-VALVE.

1,145,671.     Specification of Letters Patent.     Patented July 6, 1915.

Application filed February 23, 1911. Serial No. 610,228.

*To all whom it may concern:*

Be it known that I, JOHN A. BUTCHER, a citizen of the United States, and a resident of York, in the county of York, State of Pennsylvania, have invented a new and useful Improvement in Relief-Valves, of which the following is a specification.

My invention is an improvement in relief valves, and consists in certain novel constructions and combinations of parts hereinafter described and claimed.

The object of the invention is to provide a delicate and single seat valve of the character specified for use with boiler feed pumps to prevent over feeding, which will operate at a predetermined pressure without any possibility of sticking or the like.

A further object is to provide a valve all of whose parts are easily accessible and removable.

Referring to the drawings forming a part hereof: Figure 1 is a diagrammatic view of the system in which the valve is used; Fig. 2 is a longitudinal section of the valve; and Fig. 3 is an enlarged detail sectional view of the central portion of the diaphragm.

The present embodiment of the invention comprises a valve casing 1 having a lateral inlet 2 and a bottom outlet 3. The outlet is counterbored and threaded at 4 and a reducing sleeve 5 is threaded into the counterbored portion. The said sleeve is internally threaded at 6 to receive a connection, and is provided with a flange 7 which abuts the end of the outlet.

A valve seat 8 in the form of a washer is held between the shoulder 9 at the bottom of the counterbore and the end of the sleeve 5, and the said seat is provided with an annular flange 10 extending into the chamber and beveled to form the seat for the valve.

The seat may be easily removed for any purpose by unscrewing the sleeve 7. The valve coöperating with the seat consists of a neck 11, a head 12 resting on the seat, and provided with a polygonal lug 13 extending below the same. The neck 11 is provided with a longitudinally extending threaded lug 14 which engages a socket 15 on the stem 16 of the valve.

The stem is threaded at 17 just above the socket, and nuts 18 and 19 are threaded on the said stem. Each nut is provided with an annular flange 20, and each flange is beveled outwardly, as shown at 21, on the face adjacent to the other nut. A diaphragm is clamped between the nuts, and the said diaphragm (Fig. 3) is composed of seven leaves or disks.

The central leaf or disk 22 is of greater diameter than the others, and the outermost disks 23 are of least diameter. The disks 24 adjacent to the central disk and the disks 25 adjacent to the outermost disks are of unequal diameter, the arrangement being such that the disks gradually decrease in diameter in both directions from the central disk.

Each of the disks 23, 24 and 25 is cupped or dished slightly outward, so that the diaphragm as a whole takes the shape indicated in Fig. 3. Each disk is centrally perforated and they are held between the flanges of the nuts 18 and 19 by their extreme inner edges so that the freest possible movement is permitted to the stem.

The nut 18 is provided with a hub 26 which extends through the central openings of the disks, and the nut 19 is provided with a socket 27 for receiving the end of the hub. A tubular casing 28 is connected with the valve casing. The said casing is provided with a marginal flange 29 which abuts at its edges against a similar flange 30 on the upper end of the valve casing.

Each flange 29 and 30 is cupped or dished, as shown in Fig. 2, so that a chamber 31 is formed between the said flanges. At their free edges each flange is provided with an annular flat plane portion 32 having transverse registering perforations for receiving bolts 33. The outer edge of the disk 22 is clamped between the inner edges of the annular portions 32, while the outer edges of the disks 23, 24 and 25 engage the inner face of the adjacent flange.

The diaphragm arranged as specified is very resilient, permitting it to respond to the slightest change in pressure, so that the valve is extremely delicate in its action, yet is held firmly on or off its seat. The socket 15 moves in a bearing 34 between the chamber 31 and the interior of the valve casing, and openings 35 are provided to place the said chamber in communication with the valve casing.

A spiral spring 36 is arranged in the tubular casing 28 between the nut 19 and a disk 37 having a pin 38 extending into the coils of the spring to prevent its lateral displacement. The disk is provided with transverse openings 39, and a stem 40 provided with a hand wheel 41 is threaded through the closed top 42 of the tubular casing and engages the disk to regulate the tension of the spring.

A packing 43 encircles the stem at the outer end of the casing 28, and is held in place by a packing nut 44. The casing 28 is also provided with a threaded opening 45 for receiving a connection from the steam line of the system.

As shown in Fig. 1, the device designated generally by A is connected to the steam line 46 of the boiler 47 by means of a small pipe 48 connected with the opening 45. The pump 49, which may be steam operated as shown, or operated in any other manner, is in the present instance connected with the steam line 46 of the boiler by a steam pipe 50.

A water pipe 51 leads from the pump to a T 52 interposed in a pipe 53 leading from the inlet 2 of the valve casing to the boiler. The outlet 3 of the valve casing is connected to a suitable tank 55 or to the water supply source by means of a pipe 54.

In operation, the valve is balanced by the water pressure from the feed line under the diaphragm and the steam pressure from the steam line on the top of the diaphragm, the said diaphragm separating the water from the steam. The spring 36 above the diaphragm is to furnish the excess pressure above the steam pressure, and by turning the hand wheel 41 in the proper direction, this excess pressure may be obtained. For instance, if the boiler is working at 150 pounds steam pressure, the valve is set at 165 pounds, by increasing the tension of the spring the proper amount. The feeding now proceeds with the valve 56 opened. When the water reaches the third gage of the boiler and it is desired to stop the water from entering the boiler, the valve 56 is closed. The pressure in the feed line is now raised, and the water is forced through the ports 34 into the diaphragm chamber, and raises the said diaphragm, opens the valve and permits the water to flow from the pipe 54 to the tank from which the pump draws its supply through the pipe 57. When the water in the boiler lowers below the second gage, the valve 56 is opened, permitting the water to flow into the boiler. This lowers the pressure in the feed line and the pressure on the top of the diaphragm is stronger than the pressure below, thus closing the relief valve. The valve is exactly balanced between the water pressure and the steam pressure, and the spring pressure is used to obtain the excess pressure to feed the water into the boiler.

The valve may be easily removed for cleaning or repairs by first removing the seat and then the valve. This is done by engaging a socket wrench with the lug 13. The clamping of the edges only of the diaphragm prevents wear on the same and permits it to exercise its full resiliency.

I claim:

1. In a valve of the character specified, a valve casing having a seat, a valve for coöperating with the seat, a diaphragm connected with the valve, said diaphragm comprising a plurality of disks of resilient material, the disks gradually decreasing from the center in both directions and each having a central opening, means on the valve for clamping the edges of the central openings, and means in the casing for clamping the outer edge of the central disk, said casing having a chamber for the diaphragm coaxial with the seat, the depth of the chamber decreasing gradually toward its outer edge, and the free edges of the outer disks engaging the inner faces of the chamber, each of the outer disks being dished outwardly from the central disk.

2. In a valve of the character specified, a casing having a counterbored outlet forming a shoulder at the bottom of the counterbore, a seat having its outer edge engaging the shoulder, and a reducing sleeve threaded into the outlet and engaging the seat, a valve comprising a head for coöperating with the seat, the head having a threaded lug extending from the head in the opposite direction from the seat and having a polygonal lug extending through the seat, and a stem having a socket for engagement by the threaded lug.

3. In a valve of the character specified, a valve casing having a seat, a valve for coöperating with the seat, a diaphragm for operating the valve, said diaphragm consisting of a central and lateral disks of resilient material, the lateral disks being cupped away from the central disk, the disks gradually decreasing in diameter from the central disk in both directions, a connection between the valve and the disks at the centers thereof, and means in the casing for clamping the outer edge of the central disk, the free edges of the lateral disks bearing against the casing wall.

4. In a valve of the character specified, a valve casing having a seat, a valve for cooperating with the seat, a diaphragm for operating the valve, said diaphragm consisting of a central and lateral disks of resilient material, the lateral disks being cupped away from the central disk, a connection between the valve and the disks for operating the valve, and a connection between the casing and the edge of the central disk, the lateral disks bearing at their free edges against the wall of the casing.

JOHN A. BUTCHER.

Witnesses:
 NOAH C. MAY,
 HENRY F. OBERDICK.